UNITED STATES PATENT OFFICE.

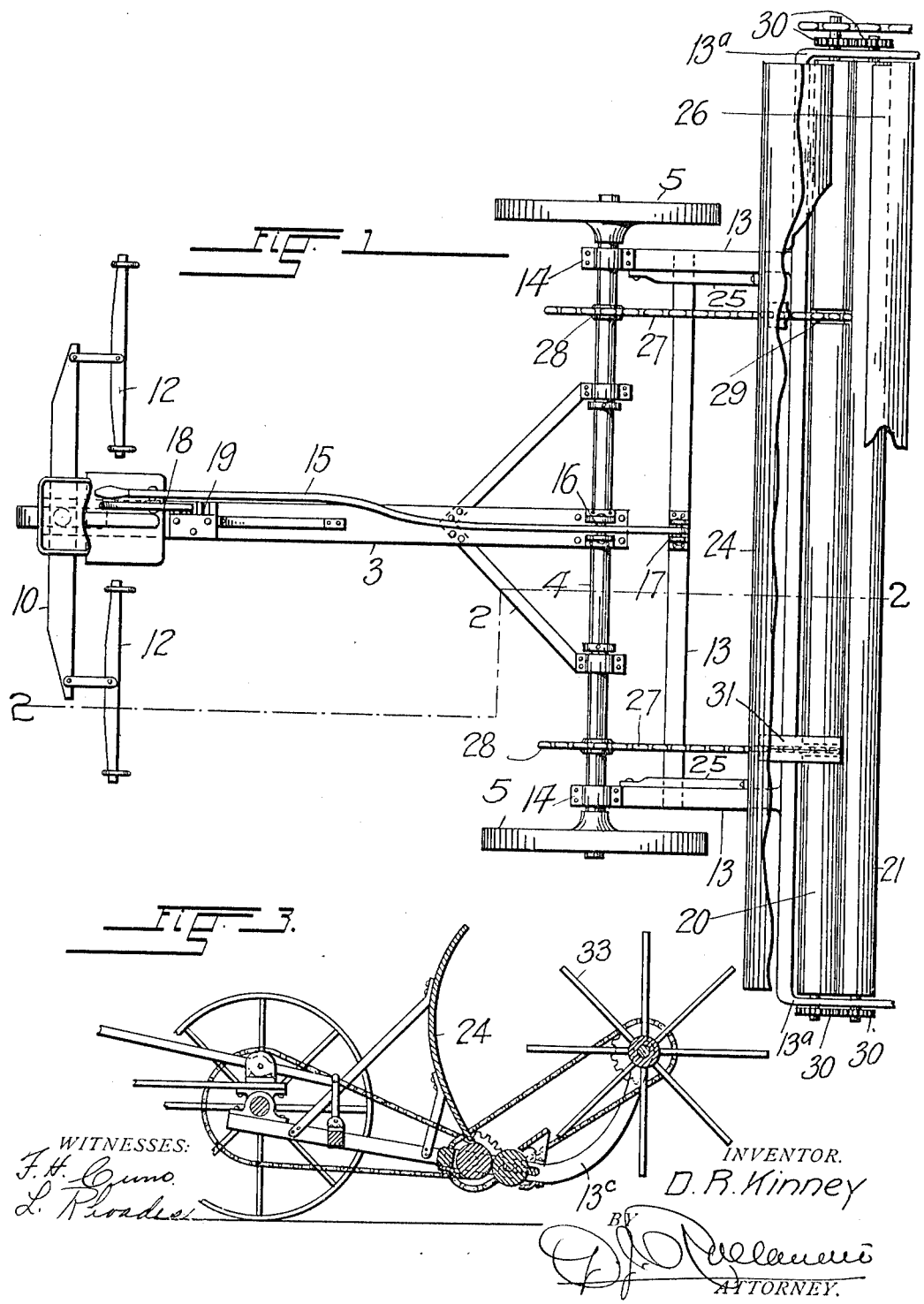

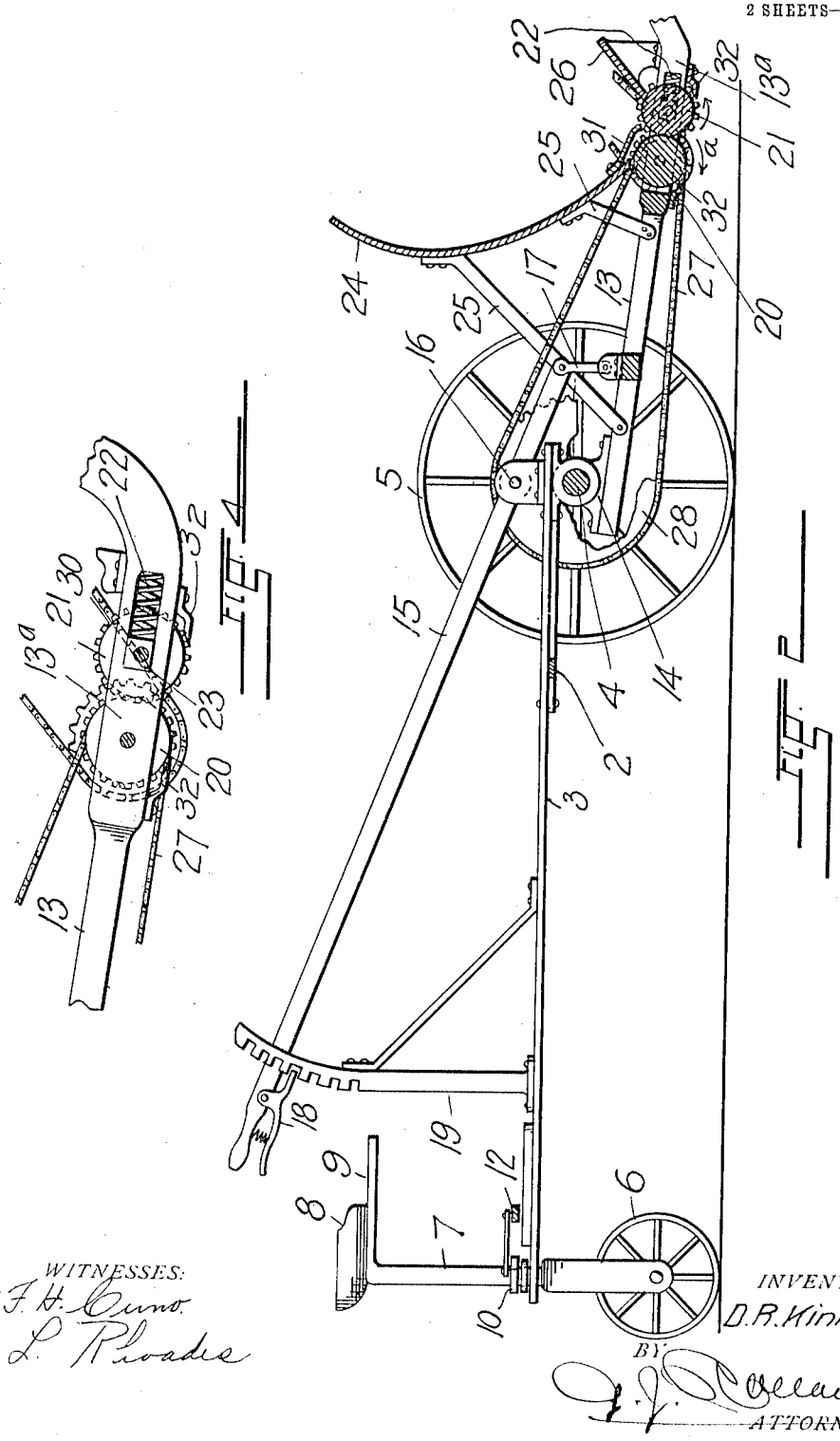

DANIEL R. KINNEY, OF GREELEY, COLORADO, ASSIGNOR OF ONE-FOURTH TO FREDERICK HERB, OF DENVER, COLORADO.

GRASSHOPPER-EXTERMINATOR.

1,040,549.  Specification of Letters Patent.  Patented Oct. 8, 1912.

Application filed January 20, 1911. Serial No. 603,661.

*To all whom it may concern:*

Be it known that I, DANIEL R. KINNEY, a citizen of the United States, residing at Greeley, in the county of Weld and State of Colorado, have invented certain new and useful Improvements in Grasshopper-Exterminators, of which the following is a specification.

My invention relates to machines for the extermination of grasshoppers and its object resides in the provision of an apparatus of simple construction which when propelled along a field under cultivation, will cause the insects aroused by the approach of the vehicle to be projected between two rotary members which crush them to death.

An embodiment of my invention is illustrated in the accompanying drawings in which, Figure 1, represents a plan view of the machine. Fig. 2, a section taken along the line 2—2 Fig. 1. Fig. 3, a view similar to Fig. 2, but drawn to a reduced scale, showing the method of applying a fan-wheel to impel the insects toward the crushing members, and Fig. 4, a fragmentary end elevation of the roller-frame drawn to an enlarged scale.

Referring to the drawings by numerals, 2 designates a carrier comprising a pole or tongue 3, an axle 4 rotatably mounted at one end thereof, ground wheels 5 at the extremities of the axle, and a tiller-wheel 6, which being pivotally mounted at the rearward end of the pole 3 is provided with an upright 7, a seat 8 and a laterally extending arm 9 to enable the driver of the vehicle to direct its course by movement of his body.

A double tree 10 secured at the rearward end of the tongue, and swingle-trees 12 attached at the extremities of the double tree, provide means for connecting the harness of the draft animals by which the carrier is propelled over the ground. A frame 13, projecting forwardly from the axle 4, is pivotally suspended therefrom by means of bearing boxes 14 and the angle of inclination of this frame may be adjusted within determined limits by means of a lever 15 which is fulcrumed upon the tongue 3, as at 16 and which is connected with the frame by means of link 17. The rearmost end of the lever which is disposed within reach of the driver is provided with a spring-catch 18 by means of which it may be secured in any one of a plurality of notches formed in the curved extremity of a post 19 which is erected upon the tongue 3.

Revolubly mounted between parallel arms 13ª at the forward end of the frame, are two rollers 20 and 21, whose circumferential surfaces are maintained in frictional contact by the action of springs 22 which are disposed between the boxes 23 in which the roller 21 is mounted and the ends of slots in the arms 13ª in which the said boxes are slidably movable. Extending upwardly from the circumferential surface of the rearward roller 20, is a curved deflecting shield 24, which is held in place upon the frame 13 by means of braces 25 and which in the operation of the machine, serves to intercept the insects aroused by the approaching vehicle and cause them to fall upon the rollers 20 and 21. A narrow apron 26 slanting upwardly and forwardly from the forward roller 21, prevents the insects deflected by the shield 24 from being projected over the said roller onto the ground in front of the machine. The rearward roller 20 is, during forward movement of the vehicle, rotated in the direction of the arrow *a* in Fig. 2, by means of chains 27 which run over the sprocket-wheels 28 and 29 mounted respectively upon the axle 3 and within recesses formed in the surface of the roller, and the rotary movement of the latter gives a similar motion to the roller 21 in the opposite direction through the instrumentality of meshing gears 30 applied at the extremities of the two rollers. Hoods 31 secured to the shield 24 project over the sprocket-wheels on the roller 20 to protect them from the insects projected thereonto, and scrapers 32 secured to the frame 13 below the two rollers are provided to remove adherent matter from the circumferential surfaces thereof.

In the construction shown in Fig. 3, a fan wheel 33 rotatably mounted at the upper extremities of extensions 13ᶜ of the arms 13ª, in front of the shield 24 and above the rollers 20 and 21, is provided to project the insects flying in the path of the vehicle against the shield. The vehicle being moved through a field, arouses the grasshoppers which flying upwardly, are brought in contact with the curved surface of the shield 24, which deflects them onto the oppositely revolving rollers between which they are crushed to death.

Having thus described my invention, what I claim and desire to secure by Letters-Patent is:—

A grasshopper exterminator comprising a carriage including a wheeled axle, a forwardly extending frame pivoted on said axis in spaced relation to the surface of the ground upon which said carriage is supported, contacting rollers revolubly mounted on said frame, means for transforming a movement of said axle into movements of said rollers in opposite directions, a curved shield on said frame, rearward of the line of contact of said rollers for deflecting insects flying in the path of the carriage onto the said rollers, a deflector of lesser height than said shield extending longitudinally with relation to said rollers forward of their line of contact to intercept insects deflected by said shield and direct them onto said rollers, and means for facing the larger shield in different directions by adjustment of the frame about its pivotal axis.

In testimony whereof I have affixed my signature in presence of two witnesses.

DANIEL R. KINNEY.

Witnesses:
G. J. ROLLANDET,
L. RHOADES.

---

Copies of this patent may be obtained for five cents each, by addressing the "Commissioner of Patents, Washington, D. C."